3,368,925
TREATING ZINC PLATES OF ZINC-SILVER
OXIDE BATTERY
Irving A. Denison, Silver Spring, Md., and William J.
Pauli and Gilbert R. Snyder, Arlington, Va., assignors
to the United States of America as represented by the
Secretary of the Army
No Drawing. Filed Nov. 15, 1957, Ser. No. 696,887
2 Claims. (Cl. 136—126)

The invention described herein may be manufactured and used by or for the Government for governmental purposes without the payment to us of any royalty thereon.

This invention relates to an improved method of treating the negative plates of a reserve-type zinc-silver oxide battery so as to provide greatly improved performance at very low temperatures.

It has recently been discovered that greatly improved activation times and discharge rates can be achieved in a reserve-type zinc-silver oxide battery used at very low temperatures by removing any zinc oxides which have formed on the zinc plates before assembling in a battery; that is, by making the plates as close to pure zinc as possible. This recently discovered method for removing these oxides involves soaking the negative zinc plates in a solution of ammonium chloride after the plates have been formed in a potassium hydroxide bath. The plates are then dried in a vacuum and preferably stored in a desiccator until assembly. During this soaking, ammonium chloride reacts with zinc and zinc oxide with the successive formation of various soluble complexes such as $ZnCl_2 \cdot 4Zn(OH)$, $ZnCl_2 \cdot 4NH_3$ and finally $$ZnCl_2 \cdot 2NH_3$$

The time of soaking and the concentration of ammonium chloride is sufficient to complete the formation of $ZnCl_2 \cdot 2NH_3$ on the zinc plates. Using zinc negatives which have been treated by this method in a reserve-type battery, makes possible a considerable improvement in the activation time and the discharge rate obtained at very low temperatures.

The recently discovered method achieves a considerable improvement in the performance of a reserve-type zinc-silver oxide battery at very low temperatures. However, this improved performance is still very far inferior to what is obtained at room temperature. This is particularly true as regards the discharge rate. The present invention provides a far greater improvement by making very low temperature battery performance almost as good as that obtained at room temperature.

We have discovered that although the recently discovered method removes the undesirable zinc oxides, excess ammonium chloride which does not react with the zinc or zinc oxide on the zinc plates, also exerts a considerable detrimental effect on the speed of activation and the discharge rate which would be possible if there were no excess ammonium chloride on the plates, that is, if the zinc plates were more nearly the desired pure zinc.

It is an object of this invention, therefore, to provide an improved method of removing zinc oxides from the negative zinc plates of a zinc-silver oxide reserve-type battery before assembly, whereby the zinc plates will be more nearly pure zinc.

It is a further object to provide a novel modification of the specific method of said copending application whereby the undesirable excess ammonium chloride which has not reacted is removed.

The specific nature of the invention, as well as other objects, uses and advantages thereof, will clearly appear from the following description.

Our novel method of removing zinc oxides is a modification of the aforementioned recently discovered method. After soaking in the ammonium chloride solution, as is done in this recently discovered method, the plates are heated under vacuum to the sublimation temperature of ammonium chloride, which is around 300° centigrade. In practice, the temperature of the electric furnace is raised until fumes of ammonium chloride are observed to condense on the surface of an evacuated glass container in which the plates are placed while heating. The container is then allowed to cool to room temperature and the contents brought to atmospheric pressure by the introduction of an inert gas, such as argon or nitrogen. It is preferable that the plates be stored in a desiccator until assembly, and then assembled in a dry atmosphere in order to prevent reformation of the oxide film.

We have also found that the length of the soaking time of the zinc plates in the ammonium chloride solution could be reduced greatly by maintaining the solution at an elevated temperature (about 80° centigrade, for example), causing the reactions involved to proceed at a much faster rate.

Using in a reserve-type battery negative zinc plates, which have had the excess unreacted ammonium chloride removed in accordance with this invention, activation times and discharge rates at very low temperatures have been obtained which are almost as good as at room temperature. Activation is instantaneous at temperatures as low as −65° Fahrenheit, regardless of the length of time that the plates have been stored in a desiccator. Instantaneous activation has been obtained even after weeks of storage. When stored in air for several weeks, activation times are still no longer than a few seconds. As regards discharge rate, a discharge rate of about 2.3 amperes per cubic inch of plate and separator assembly is obtained at −65° Fahrenheit as compared with a discharge rate of only about 0.25 ampere per cubic inch for zinc plates treated using the aforementioned recently discovered method. The above figures indicate a real breakthrough in the low temperature problem.

The reserve-type battery in which the zinc negatives of our invention may be employed may comprise an evacuated chamber in which the positive and negative plates are placed, and an isolated second chamber in which a potassium hydroxide electrolyte is placed. Activation may be accomplished by puncturing the electrolyte chamber in response to impact, or any other desired condition.

A detailed example of procedure which incorporates the improved method of our invention will now be given.

FORMING PROCEDURE

Cut a zinc-plated brass screen of 40 x 40 mesh and 0.009 inch wire diameter into strips of 6¼ x 1¼ inches. Solder coat the edge of the strip by dipping (¼ inch), leaving 6¼ x 1 inch of bare screen. Solder a lead wire to the end of the soldered edge, and cover the soldered edge with a strip of electrical tape.

Mix powdered zinc oxide with just enough 31% potassium hydroxide to make a thin paste. Lay the screen on a 2 x 8 inch piece of paper (Webril EM–233) and apply the paste with a spatula to the bare screen. Lay a second sheet of paper on top. Turn the plate over, remove the paper from the back of the screen, apply the paste, and replace the paper.

Pass the plate between rollers set at 0.063 inch (0.055 for pasted plate plus 0.008 inch for paper). Enough paste should be present so that the excess squeezes out from the end of the screen, leaving a uniform thickness on the screen. Peel off the paper from both sides, trimming the excess paste from the edge of the screen, and replace with fresh paper (1 x 6½ inches).

Slit one edge of a 12-inch length of cellophane tubing (Visking Corp. cellulose Nojax casings 36/32). With the folded edge of cellophane downward and the taped edge of plate upward, lay plate inside equidistant from the ends of the tubing. Fold the two loose ends of cellophane flat against the plate, one on each side of the plate. Fold a ¾ x 6¾ inch (folded lengthwise) piece of fabric (Webril R-2805) around the plate, with the folded edge on bottom.

Stack plates alternately with nickel strips (0.005 x 1⅛ x 6¾ inches with tabs of electrical connections), starting and ending with nickel. Place stack on the edge of a plastic tray (Lucite, inside dimensions 6⅞ inches x 2 inches wide x 1¼ inches deep). Fill the unused space with plastic strips (Lucite, ³⁄₁₆ x 1¼ x 6¾ inches). Use small plastic shims (Lucite, ¹⁄₁₆ x 1¼ x 1¼ inches) to make a snug fit. Connect plates in parallel and to the negative terminal of an electroplater. Connect the nickel strips to the positive terminal. Fill the tray with 31% potassium hydroxide until the level remains close to the top. Reduce the plates at ½ ampere per plate for 16 hours.

TREATMENT AFTER FORMING

Disassemble the bath. The plates should show no visible white areas of zinc oxide. Remove fabric, cellophane paper, tape and lead wires, and put plates immediately into a 15% ammonium chloride solution maintained at 80° centigrade. After a few quick rinses with this solution, pass the plates (0.058 to 0.065 inch thick) through rollers set at 0.055 inch to bring them down to uniform size. Return plates to the 15% ammonium chloride solution at 80° centigrade and let the plates soak for 1 hour. Remove the plates from the solution, blot lightly with a paper towel. Put the plate in an evacuated glass container and place in an electric furnace. Raise the temperature of the electric furnace until fumes of ammonium chloride are observed to condense on the surface of the glass container. Then turn off the heat in the electric furnace and allow the glass container to cool to room temperature. Introduce argon into the glass container to restore atmospheric pressure. Remove the plates from the container and punch plates in accordance with the dimensions desired. Store in a desiccator until assembly.

It will be apparent that the embodiment shown is only exemplary and that various modifications can be made in construction and arrangement within the scope of the invention as defined in the appended claims.

We claim as our invention:

1. A method of treating negative zinc plates before assembling in a zinc-silver oxide reserve battery intended for use at very low temperatures, said plates having been formed by electrolytic deposition in an alkaline bath, said method comprising the steps of: soaking the zinc plates immediately after removal from the alkaline bath in an ammonium chloride solution, the time of soaking and the concentration of ammonium chloride being sufficient to complete the formation of $ZnCl_2 \cdot 2NH_3$ on the zinc plates, removing the plates from said solution, heating the plates under vacuum to the sublimation temperature of ammonium chloride so as to remove unreacted ammonium chloride from the plates, cooling the plates to room temperature, bringing the cooled plates to atmospheric pressure by the introduction of an inert gas, and then storing the plates in an inert environment until assembly.

2. A method of treating negative zinc plates before assembling in a zinc-silver oxide reserve battery intended for use at very low temperatures, said plates having been formed by electrolytic deposition in an alkaline bath, said method comprising the steps of: soaking the plates immediately after removal from the alkaline bath in a 15% ammonium chloride solution maintained at a temperature of approximately 80° centigrade for about one hour, removing the plates from said solution, placing the plates in an evacuated glass container, heating the evacuated glass container until fumes of ammonium chloride are observed to condense on the surface of the glass container, cooling the glass container to room temperature, bringing the cooled plates to atmospheric pressure by introducing an inert gas into the glass container, removing the plates from the glass container and then storing the plates in a desiccator until assembly.

References Cited

UNITED STATES PATENTS

| | | | |
|---|---|---|---|
| 2,399,127 | 4/1946 | Lipinski | 136—127.1 X |
| 2,640,864 | 6/1953 | Fischbach et al. | 136—126 |
| 2,656,402 | 10/1953 | Fischbach et al. | 136—126 |
| 2,145,817 | 1/1939 | Stoops | 75—103 |

FOREIGN PATENTS 751,320    6/1956    Great Britain.

OTHER REFERENCES

Mellor, Comprehensive Treatise on Inorganic and Theoretical Chemistry, vol. 4 (1926), page 420, Longmans, Green & Co., London.

ALLEN B. CURTIS, *Primary Examiner.*

ROGER L. CAMPBELL, LEON ROSDOL, *Examiners.*

W. A. KEMMEL, C. D. QUARFORTH,
O. F. CRUTCHFIELD, *Assistant Examiners.*